United States Patent
Chiang et al.

(10) Patent No.: US 6,741,863 B1
(45) Date of Patent: May 25, 2004

(54) METHOD AND APPARATUS FOR LOCATING A WIRELESS MOBILE UNIT

(75) Inventors: Tung C. Chiang, Berkeley Heights, NJ (US); Byron H. Chen, Whippany, NJ (US); Howard Huang, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/215,344

(22) Filed: Dec. 18, 1998

(51) Int. Cl.[7] ................................................. H04Q 7/20
(52) U.S. Cl. ..................... 455/456.1; 455/440
(58) Field of Search .................. 455/456, 457, 455/456.1, 456.2, 456.3, 456.4, 456.5, 456.6, 440, 560, 414.2, 441, 521, 67.11, 115.1, 226.1; 342/450–458, 357.11–357.17; 340/993

(56) References Cited

U.S. PATENT DOCUMENTS

| | | | |
|---|---|---|---|
| 5,414,432 A | * 5/1995 | Penny, Jr. et al. | |
| 5,583,517 A | * 12/1996 | Yokev et al. | 342/457 |
| 5,583,776 A | * 12/1996 | Levi et al. | 364/450 |
| 5,592,173 A | * 1/1997 | Lau et al. | 342/357 |
| 5,680,140 A | * 10/1997 | Loomis | 342/357 |
| 5,689,431 A | * 11/1997 | Rudow et al. | 364/449.7 |
| 5,777,580 A | * 7/1998 | Janky et al. | 342/457 |
| 5,784,339 A | * 7/1998 | Woodsum et al. | |
| 5,890,068 A | * 3/1999 | Fattouche et al. | |
| 5,917,449 A | * 6/1999 | Sanderford et al. | |
| 5,926,765 A | * 7/1999 | Sasaki | |
| 6,014,102 A | * 1/2000 | Mitzlaff et al. | |
| 6,028,551 A | * 2/2000 | Schoen et al. | |
| 6,031,490 A | * 2/2000 | Forssen et al. | |
| 6,054,950 A | * 4/2000 | Fontana | |
| 6,083,248 A | * 7/2000 | Thompson | |
| 6,097,959 A | * 8/2000 | Yost et al. | 455/456.2 |
| 6,141,558 A | * 10/2000 | Chen | 455/440 |

FOREIGN PATENT DOCUMENTS

| | | |
|---|---|---|
| CA | 2171333 | 1/1996 |
| CA | 2213979 | 4/1998 |
| WO | WO 96/02007 | 1/1996 |

* cited by examiner

Primary Examiner—Curtis Kuntz
Assistant Examiner—Barry W Taylor

(57) ABSTRACT

A position locator enables the detection of an originating location of a 911 caller under various RF propagation positions. Through the use of a transceiver and global positioning unit in a portable position locator, even if only one base station receiving the 911 call can be detected, the origin of the 911 call can still be located. Utilizing information from the position locator and at least one base station, an estimated distance between the position locator and the 911 caller, as well as an estimated distance between the at least one base station and the 911 caller, can be determined utilizing TOA or TDOA techniques to enable the location of the caller. An emergency vehicle carrying the position locator can constantly monitor and move toward the location of the 911 caller calling from a wireless mobile unit.

21 Claims, 4 Drawing Sheets

METHOD AND APPARATUS FOR LOCATING A WIRELESS MOBILE UNIT

BACKGROUND OF THE INVENTION

1. Field of the Invention

The present invention relates generally to a method and apparatus for locating a wireless mobile unit, and more particularly to locating a wireless mobile unit from which a mobile caller is making a distress call.

2. Description of the Related Art

When a caller is dialing an emergency call (E911), it is important for an emergency vehicle responding to the E911 call to accurately locate the caller. For a caller utilizing a wireless unit, such as a mobile caller on a cellular phone, determining an exact location of the caller can be difficult.

Prior art FIG. 1 illustrates a known method for determining a location from which a mobile caller originates a call on a wireless mobile unit 2. Specifically, the E911 call originating from the wireless mobile unit 2 reaches at least one cellular base station, such as base station 4. The signal of the call then typically radiates to a second base station 6 and to a third base station 8. Methods for determining such a location include both time difference of arrival (TDOA) and time of arrival (TOA) methods. These two methods are explained as follows.

Utilizing a known time of arrival (TOA) method as shown in FIG. 1, a first distance "a" between the wireless mobile unit 2 and first base station 4 is estimated; a second distance "b" between the wireless mobile unit 2 and second base station 6 is estimated; and a third distance "c" between the wireless mobile unit 2 and third base station 8 is estimated. Based on the time that it takes for the wireless signal to reach each of the base stations, the approximate distances "a", "b", and "c" are determined using the known TOA method, as follows.

As shown in FIG. 1, three circles are indicated, one around base station 4, one around base station 6, and one around base station 8. Each of the circles encircle the wireless mobile unit 2. The circles are represented by the following three equations:

$$((x-x1)^2+(y-y1)^2)^{1/2}=a=C(t1-T)$$

$$((x-x2)^2+(y-y2)^2)^{1/2}=b=C(t2-T)$$

$$((x-x3)^2+(y-y3)^2)^{1/2}=c=C(t3-T)$$

In the above-mentioned equations, the coordinates of the wireless mobile unit 2 are represented by (x,y); the coordinates of base station 4 are represented by (x1,y1); the coordinates of base station 6 are represented by (x2,y2); and the coordinates of base station 8 are represented by (x3,y3). Further, t1, t2, and t3 represent half of the round trip delay time of signals traveling from base station 4, base station 6, and base station 8, respectively to wireless mobile unit 2 and back. Finally, T is the processing time of wireless mobile unit 2 and C is the speed of light.

Utilizing the known TOA method of detecting a location of a wireless mobile unit 2, the absolute time of the signal traveling from the wireless mobile unit 2 to the various base stations is measured to find the distances a, b and c and to eventually arrive at an approximate (x,y) location for the wireless mobile unit 2. However, the clock in the wireless mobile unit 2 may not exactly synchronize with that of the various base stations 4, 6, and 8. Accordingly, absolute time is measured by a round trip delay in the time of a signal sent from a particular base station to the wireless mobile unit 2 and back to the base station. However, round trip delay includes processing time in the wireless mobile unit 2 that needs to be estimated. Normally, it can be estimated based on the knowledge of a particular brand of the wireless mobile unit 2.

Another known option for determining a location from which a mobile caller originates a call on wireless mobile unit 2 is to use a time difference of arrival (TDOA) method. TDOA measures the time difference of arrival for signals from the wireless mobile unit 2 to two or more base stations. Hence, the timing factors in the wireless mobile unit 2 are cancelled from the TOA equations expressed above. Assuming that the processing time of the wireless mobile unit is small or known, however, TOA can still be used.

FIG. 2 illustrates an example of a TDOA method involving two hyperbolas with foci at base station 4 and base station 8. The hyperbola "ab" is constructed using the TDOA between base station 6 and base station 4, in reference to the wireless mobile unit 2. Further, the hyperbola "cd" is constructed by using the TDOA between base station 6 and base station 8, in reference to the wireless mobile unit 2. The hyperbolas are determined, with the same coordinates and values previously expressed using TOA, based upon the following equations:

$$((x-X2)^2+(y-y2)^2)^{1/2}-((x-x1)^2+((y-y1)^2)^{1/2}-C(t2-t1)$$

$$((x-X3)^2+(y-y3)^2)^{1/2}-((x-x1)^2+((y-y1)^2)^{1/2}-C(t3-t1)$$

Accordingly, with these known methods, TOA and TDOA can be used in an ideal situation to determine a location of a wireless mobile unit 2. However, as shown in FIGS. 1 and 2, both the TOA and TDOA methods require the identification of three base stations, 4, 6 and 8 in order to utilize their methods to determine the location of a wireless mobile unit 2. In some instances, however, all three base stations 4, 6 and 8 cannot be determined. An example of this situation is shown in prior art FIG. 3.

The known TOA and TDOA methods of detecting a location of a wireless mobile unit 2, in many instances, only provide an estimated location. Additionally, if all three base stations are not detected, the estimated area cannot even be detected.

For example, as shown in prior art FIGS. 3(a) and 3(b), barriers such as buildings, for example, can block signals from being received by distant base stations. Accordingly, although the cellular call from wireless mobile unit 2 may still be able to go through, only a single base station may detect the call. If only two of the three base stations (6 and 8 as shown in FIG. 3(a) for example) can be detected, only two distances such as "b'" and "c" can be calculated, resulting in non-unique solutions. If only one or two base stations can be detected, the location of the wireless mobile unit 2 can only be roughly estimated, at best.

As shown in FIG. 3(a) for example, if only two base stations 6 and 8 are identified in a TOA system, then only two circles can be determined and only a parabolic area 10 can be estimated as the approximately location of a wireless mobile unit 2. Similarly, if only base stations 6 and 8 are identified in a TDOA system, as shown in FIG. 3(b), only one parabola "cd" can be calculated and the location of the wireless mobile unit 2 can only be roughly estimated at best.

Accordingly, there is a need for a better system and method for determining the location of a wireless unit 2, and especially a mobile caller calling E911.

SUMMARY OF THE INVENTION

Utilizing the device and method of the present invention, a position locator is used as a type of floating base station for determining a location of a wireless mobile unit emitting a 911 call. By this arrangement, a distance between the wireless mobile unit and the position locator is estimated, along with the estimated distance between the wireless unit and a single cellular base station, so that the location of the wireless mobile unit emitting the 911 call is accurately determined, even when only one base station receives the call.

BRIEF DESCRIPTION OF THE DRAWINGS

The features, aspects and advantages of the present invention will become better understood with regard to the following description, appended claims, and accompanying drawings wherein like numerals represent like elements and wherein;

DETAILED DESCRIPTION OF THE PRESENT INVENTION

Figure 4:
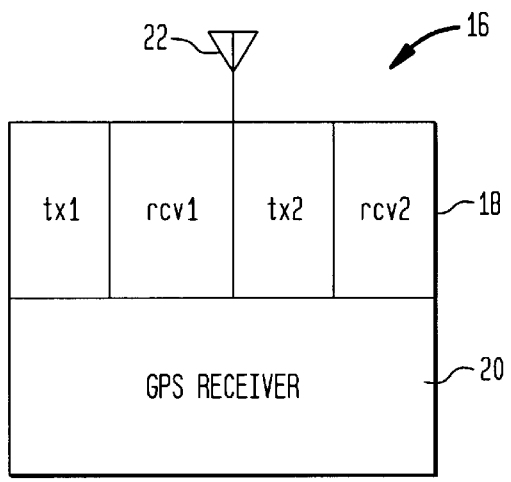
FIG. 4 illustrates the position locator of the present invention.

FIG. 4 illustrates a preferred embodiment of the position locator 16 of the present invention. The position locator 16 preferably includes a transceiver 18, for transmitting and receiving signals through an antenna 22. The antenna 22 may or may not be integrated into the position locator 16 (the position locator 16 may connect to an antenna of an emergency vehicle to carry the position locator 16, for example).

The position locator 16 further includes a global positioning system (GPS) receiver 20. This GPS receiver accurately detects longitude and latitude information indicating the position of the position locator 16, which in turn are transmitted through transceiver 18.

As shown in FIG. 4, tx1 and rcv1 preferably illustrate the downlink transceiver portion of transceiver 18 (communicating with the wireless mobile unit 2), while tx2 and rcv2 preferably illustrate the uplink transceiver portion of transceiver 18 (communicating with the base stations 4, 6, 8). Digital signal processors, memory and correlators are included within each of the uplink and downlink transceiver portions of transceiver 18. Further, the antenna 22 can be a dual mode antenna that serves both transceiver 16 and GPS receiver 20, or separate antenna elements can be used.

Figure 5A:
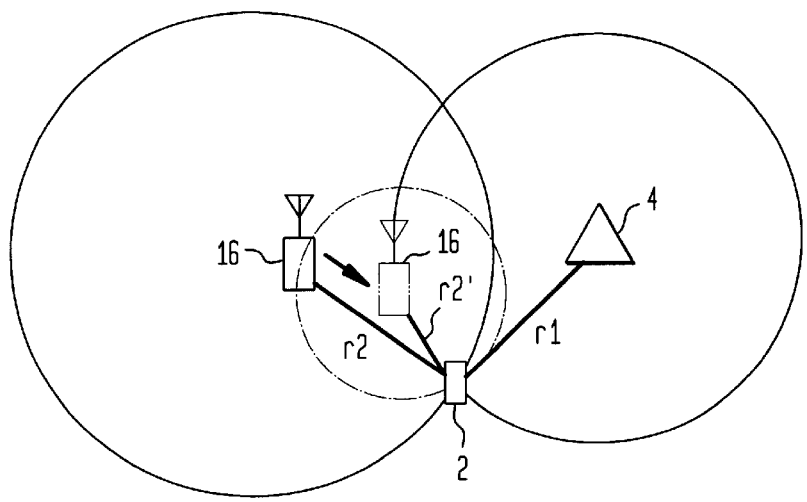
FIGS. 5(a) and 5(b) illustrate the position locator of the present invention used in locating a wireless mobile unit emitting a call with TOA.
Figure 5B:
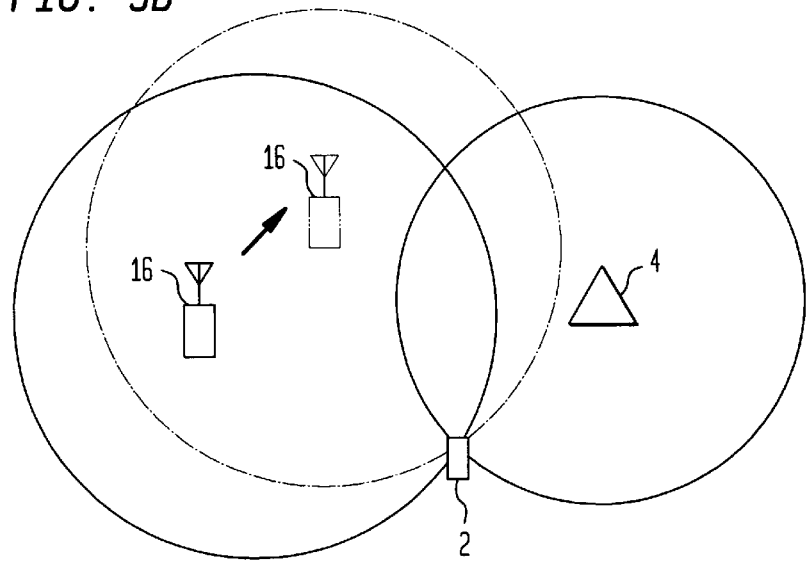
Figure 6A:
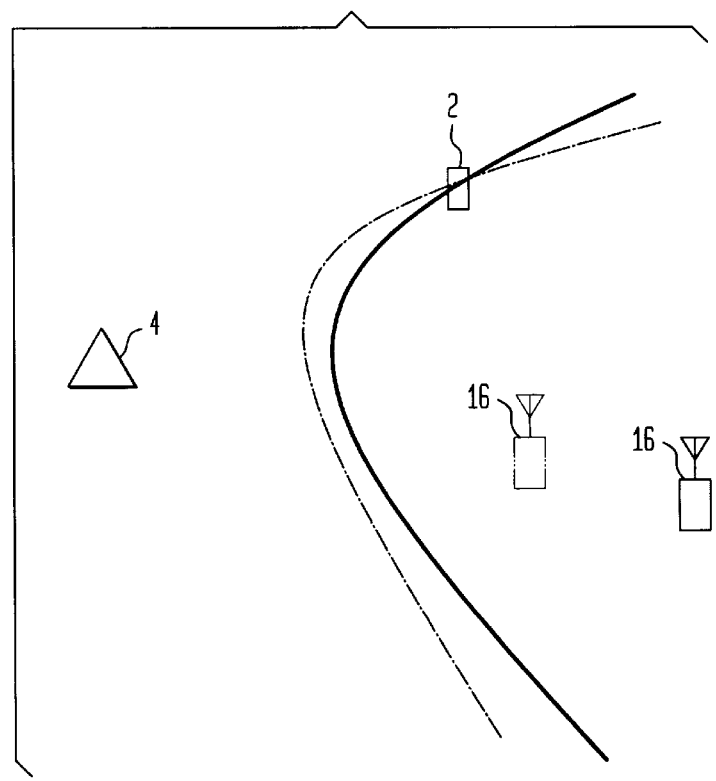
FIGS. 6(a) and 6(b) illustrate the position locator of the present invention used in locating a wireless mobile unit emitting a call with TDOA.
Figure 6B:
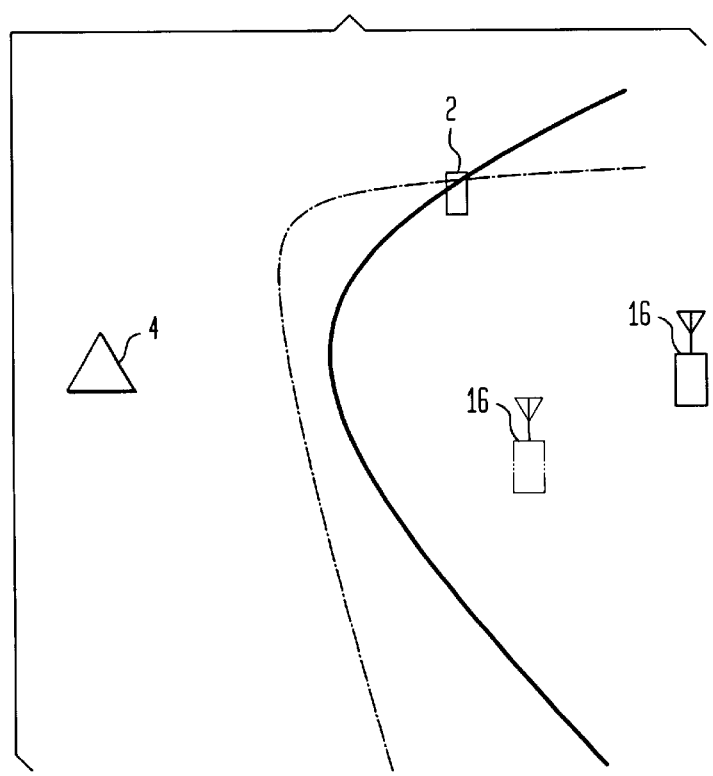

FIGS. 5(a) and 5(b) illustrate the use of a position locator 16 of the present invention using TOA. More specifically, as shown in FIG. 5(a), the position locator 16 transmits and detects signals through transceiver 18 to and from wireless mobile unit 2 and base station 4. The position locator 16 is used as a roving base station to ensure that even if other base stations cannot be detected and even if distances between base stations and the wireless mobile unit 2 cannot be determined, the location of the wireless mobile unit 2 is determined. This is done using either TOA (FIGS. 5(a) and 5(b)) or TDOA (FIGS. 6(a) and 6(b)).

Once a call, such as a 911 emergency call, has been made from wireless mobile unit 2, and it becomes necessary to locate the position of the wireless mobile unit 2 from which the call is emanating, a primary service area (PSAP) provider servicing the area of the caller utilizing a wireless unit 2 is notified. The approximate area of the caller utilizing the wireless unit 2 can be determined by an existing method, such that a PSAP serving that area can be notified. Thereafter, the PSAP dispatches a rescue vehicle, that is near the caller, toward the general area, the rescue vehicle being equipped with a position locator 16 of the present invention.

After the rescue vehicle including the position locator 16 is dispatched, at least one base station 4 receiving the 911 call from the wireless mobile unit 2 is determined, and the position of the at least one base station 4 is known. Thereafter, through the use of GPS receiver 20 the position of the position locator 16, located in the rescue vehicle is determined.

Considering the example shown in FIG. 5(a), the basic element in the algorithm is estimation of the distance denoted by "r1" between base station 4 and the wireless mobile unit 2, and the estimation of the distance denoted by "r2" between the position locator 16 and the wireless mobile unit 2. Once "r1" and "r2" are known, two circles can be computed as shown in FIG. 5(a) utilizing the coordinates of the position locator 16, received through a GPS receiver 20, as the center of the first circle and "r2" as the radius; and utilizing the coordinates of the base station 4 as the center of the second circle and "r1" as the radius.

The value of "r1" as shown in FIG. 5(a) is preferably estimated using a round trip delay (RTD) measurement obtained by the base station 4 sending an RTD measurement request to the wireless mobile unit 2 upon receiving an E911 call, for example. The wireless mobile unit 2 then immediately responds with a message. The base station 4 calculates the RTD by using the time of the measurement request, and the time of the received response from the wireless mobile unit 2. The distance "r1" is then calculated as: r1=C(RTD/2), where C is the speed of light.

To estimate the TOA for the position locator 16, the position locator 16 will have to receive the same RTD response that is sent to the base station 4 by the wireless mobile unit 2. Assuming t0 denotes the time when the base station 4 sends the RTD measurement request; t1 represents the time when the wireless mobile unit 2 receives the request; t2 represents the time when the wireless mobile unit 2 sends the response; t3 represents the time when the base station 4 receives the response from the wireless mobile unit 2; and t4 represents the time when the position locator 16 receives the same RTD response from the wireless mobile unit 2, the TOA for the position locator 16 can be estimated. More specifically, further assuming that t1=t2 by ignoring the processing time, t1–t2 for the time being, t2 is calculated as: t2=t3–RTD/2; and the TOA for the position locator 16 is then calculated as t4–t2. Once the TOA is known, the distance "r2" is then calculated as: r2=C(t4–t2), where C is the speed of light.

Upon receiving the response from the wireless mobile unit 2, the position locator 16 immediately sends the value of t4 to the base station 4 via the uplink transceiver portion tx2 of the transceiver 18. The position determination equipment (POE) of the base station 4 performs the TOA calculations set forth above and solves the equations or relays the information to the POE in the mobile switching center (MSC) to solve the equations to determine the location of the wireless mobile unit 2. More specifically, the x,y location of the base station 4 is known, and the x,y position of the position locator 16 is also known based upon information received from GPS receiver 20 of the position locator 16. Accordingly, utilizing the x,y locations of the base station 4 and position locator 16, and utilizing "r1" and "r2" as radii, the respective circles, shown by solid lines in FIG. 5(*a*) can be determined.

Of further note, to detect the signal from the wireless mobile unit 2, the position locator 16 must know the PN code of the wireless mobile unit 2. The primary base station 4 preferably sends this information to the position locator 16 via a dedicated link utilizing a regular traffic channel. The position locator 16 must allocate memory space to buffer the signal from the wireless mobile unit 2. Once the position locator 116 receives the PN code of the wireless mobile unit 2 from the primary base station 4 via the uplink receiver rcv2 of transceiver 18, then it will demodulate the signal utilizing the PN code of the wireless mobile unit 2.

More specifically, utilizing the position of the base station 4 as an origin, and using the first estimated distance "r1" between the base station 4 and the wireless mobile unit 2 as a radius, a first circle is determined. With $B_x$ and $B_y$ being the X,Y coordinates of the base station position, and with $r_1$ being the first estimated distance, the first circle is represented by the equation:

$$(X-B_X)^2+(Y-B_Y)^2=r_1^2.$$

Then, utilizing the position of the position locator 16 determined as an origin, and the second estimated distance "r2" as a radius, a second circle is determined. With $P_X$ and $P_Y$ being the X,Y coordinates of position locator 16, and with $r_2$ being the second estimated distance, the second circle is represented by the equation:

$$(X-P_X)^2+(Y-P_Y)^2=r_2^2.$$

Using the determined positions $B_X$, $B_Y$, $P_X$, $P_Y$, and using the determined distances $r_1$ and $r_2$, the intersections of the two circles can be computed using simultaneous equations. Solving for X and Y results in two X,Y pairs of intersecting points of the two circles, one originating from each of the base station 4 and position locator 16 and each respectively radiating by the estimated first and second distances "r1" and "r2". These two X,Y coordinate pairs represent the two possible locations of the wireless mobile unit 2.

Thereafter, as shown by the dashed lines in FIG. 5(*a*), the rescue vehicle carrying the position locator 16 moves towards one of the two locations. Then, the second distance between the position locator 16 and the wireless unit 2 is re-estimated as "r2'", in a similar manner as that previously described, after the position locator has moved toward the selected one of the two calculated intersecting points. It is then determined whether or not the re-estimated second distance "r2'" is shorter than the estimated second distance "r2" (in the base station 4 or MSC). If so, then the selected one of the two calculated intersecting points is chosen as the location of the wireless mobile unit 2. This is because, if the rescue vehicle with the position locator 16 has chosen the correct one of the two possible locations of the wireless mobile unit 2, it will be moving towards the wireless mobile unit 2 and the distance between it and the wireless mobile unit 2 will be decreasing.

If the re-estimated second distance r2' is not shorter than the estimated second distance r2, as shown in FIG. 5(*b*), then the rescue vehicle is moving in the wrong direction. If so, then the non-selected one of the two calculated intersecting points is chosen as the location of the wireless mobile unit 2 and the rescue vehicle with position locator 16 will thereafter adjust its course toward the correct location of wireless mobile unit 2. This occurs under the direction of the base station 4 or MSC, based upon the determination made by the POE therein. As the rescue vehicle with the position locator 16 moves towards the chosen one of the two calculated intersecting points, the calculations are repeated. The process ends when the distance between the position locator 16 and the wireless mobile unit 2 is approximated to 0.

Preferably, the location algorithm, for locating the wireless mobile unit 2 as set forth above, is run on an application server attached to the base station 4, referred to as the POE. A Kalman Filter is preferably used to track the relative movement of the position locator 16 in the rescue vehicle and the wireless unit 2. Alternatively, however, the POE can be located at the MSC for example.

FIGS. 6(*a*) and 6(*b*) illustrate the use of a position locator 16 of the present invention using TDOA.

FIG. 6(*a*) illustrates the position located 16 determining one of two possible locations for the wireless mobile unit 2, selecting the correct location, and moving toward the wireless mobile unit 2 (dashed version of position locator 16). FIG. 6(*b*) illustrates the position locator 16 moving away from the wireless mobile unit 2 (dashed version of position locator 16).

One way to use the position locator 16 using TDOA is to utilize the forward link signal; and another way is to utilize the reverse link signal. Utilizing the forward link, the operation is explained as follows.

The position locator 16 transmits a pilot signal (pilot PN code) via the downlink transceiver portion of the transceiver 18 (txl, rcvl). The pilot PN code is one that belongs to a very distant base station. This is to avoid conflicting with the local PN codes, so that the system will not hand the call over to the position locator 16 with a particular PN code.

The MSC receives the transmitted PN code and then adds the PN code of the position locator 16 to a candidate list of wireless mobile units, to let the wireless mobile unit 2 detect this PN code. The wireless mobile unit 2, once it detects such a PN code, then reports back to its primary base station 4. The reporting back includes the PN code chip offset and the signal strength upon being requested by the base station 4 using a power strength measurement request. The base station 4 then calculates the TDOA and solves the equation or relays the information to the MSC to solve the previously mentioned TDOA equations to determine the location of the wireless mobile unit 2, as represented by the solid line hyperbola of FIGS. 6(*a*) and 6(*b*).

In other words, the position locator 16 is again able to act as a roving base station to ensure that even if other base stations cannot be detected, the location of the wireless mobile unit 2 is detected utilizing the TDOA method. As shown in FIG. 6(*a*), when the position locator 16 moves toward the wireless mobile unit 2, a second dashed-line hyperbola is determined in a similar manner to that explained above. FIG. 6(*b*) illustrates the contrary situation, where the position locator 16 moves away from the wireless mobile unit 2, and a different dashed-line hyperbola is determined in a similar manner to that explained above. In either instance, the two hyperbolas of both FIGS. 6(*a*) and 6(*b*) will intersect, as shown, at the location of the wireless mobile unit 2 and the correct location can therefore be determined using TDOA, in a manner similar to that described previously using TOA with regard to FIG. 5.

Another option for specifically utilizing the position locator 16 in a TDOA method, is to use a reverse link signal. In this situation, the wireless mobile unit 2 transmits a traffic signal as usual in making or emitting its E911 call. The primary base station 4 then demodulates this signal. The base station 4 transmits the PN code of the wireless mobile unit 2 to the position locator 16.

The position locator 16 also receives the traffic signal from the wireless mobile unit 2 and buffers it utilizing allocated memory space. Upon receiving the PN code of the wireless mobile unit 2 from base station 4 via the uplink receiver portion of transceiver 18 (rcv2), the position locator 16 demodulates the traffic signal of the wireless mobile unit 2.

Thereafter, the position locator 16 then sends the chip offset (with 1/8 chip resolution) to the base station 4 via the uplink transmitter portion of the transceiver 18 (tx2). The base station 4 then calculates the TDOA and solves the equations or relays the information to MSC to solve the equations to determine the location of the wireless mobile unit 2 in a known manner utilizing the TDOA equations previously described.

It should be noted that the method set forth above is but one preferred embodiment of the present invention. Any and all methods utilizing at least two known points and distances are encompassed within the spirit and scope of the present invention, as will be apparent.

The above is illustrative of the various aspects of the present invention and therefore the spirit and scope of the present invention should not be limited to the description of the preferred embodiments contained herein. For example, FIGS. 5(*a*) and 5(*b*) and 6(*a*) and 6(*b*) involve a situation where only one base station 4 can detect a call emanating from a wireless mobile unit 2. However, the system and method of the present application, utilizing a position locator 16, can also readily detect or determine an originating location of the wireless unit 2 based upon the determined location of more than one base station. Accordingly, if two base stations or all three base stations are detected, the originating location of the wireless mobile unit 2 can also be detected. Instead of calculating two intersecting points of two circles as discussed above, another equation based on the distance between the position locator 16 and one mobile unit can be used to determine the unique solution for the location of the wireless unit 2, for example. Further, although the present invention was designed to be used to locate a caller with a wireless mobile unit 2 calling an emergency 911 number under various RF propagation conditions, it should not be limited thereto. The present invention can be used to identify the position of any wireless mobile unit 2 for any reason. Further, the position locator 16 has been discussed as preferably being located in a rescue vehicle such as an ambulance or a police car for example, but should not be limited thereto. The position locator 16 is preferably a portable unit which can be carried or placed on a person or in any type of vehicle.

Figure 1:
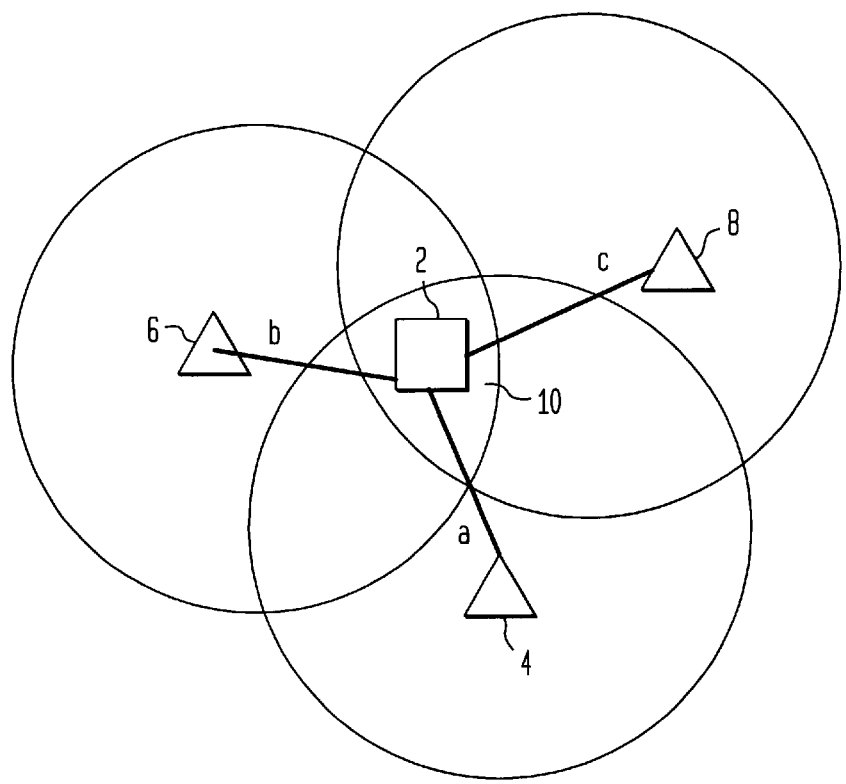
FIG. 1 illustrates a prior art system for estimating a calling area of a wireless mobile unit based on TOA.
Figure 2:
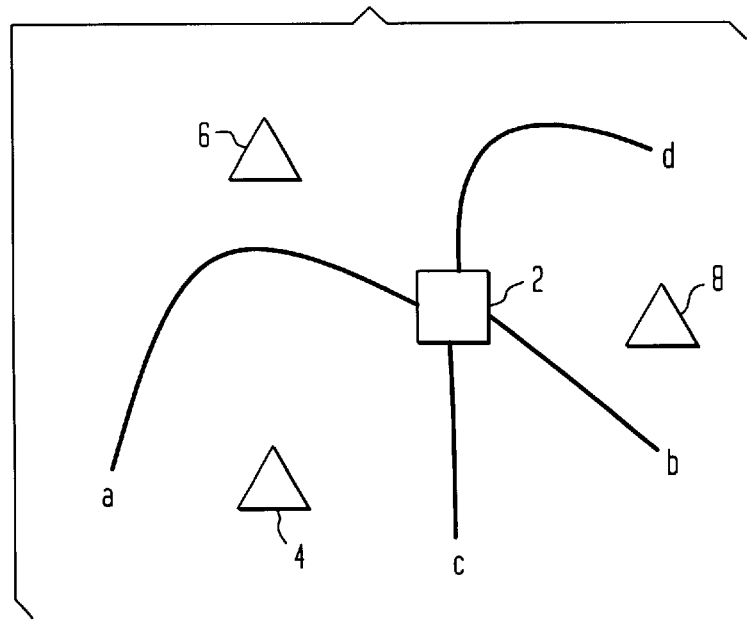
FIG. 2 illustrates a prior art system for estimating a calling area of a wireless mobile unit based on TDOA.
Figure 3A:
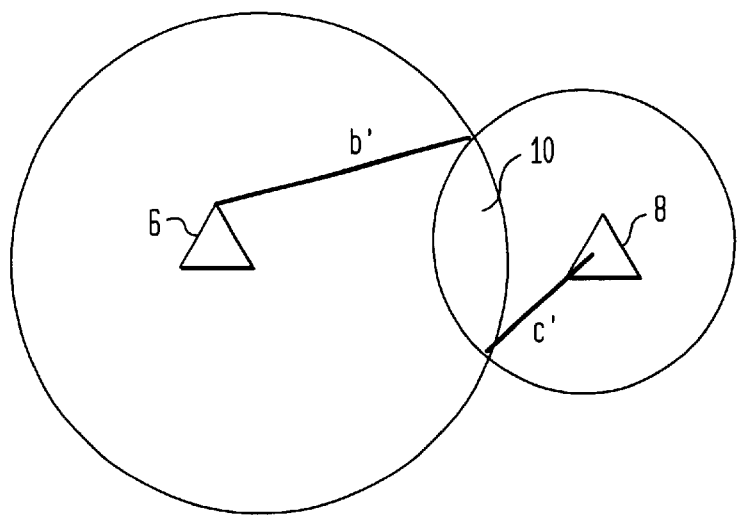
FIGS. 3(a) and 3(b) illustrate problems occurring in the prior art TOA and TDOA system of FIGS. 1 and 2.
Figure 3B:
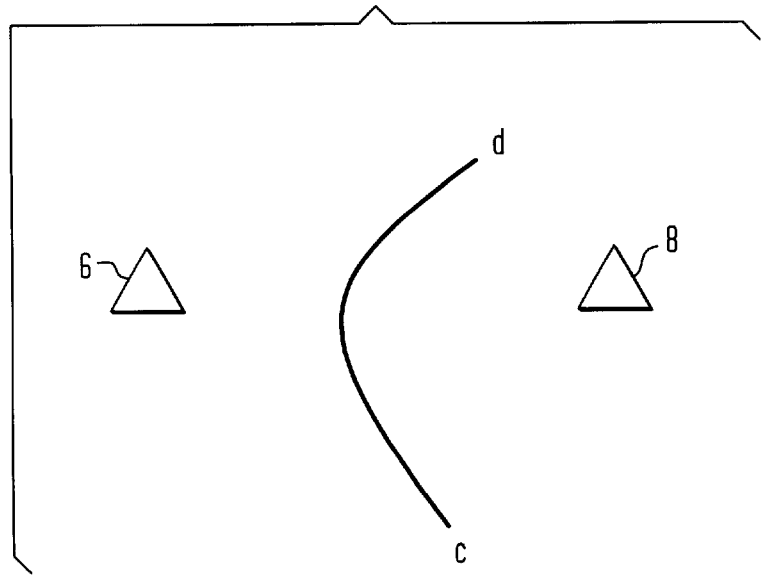

Further, the base station 4 has preferably been discussed as running the position locating algorithm or method. However, it should be readily recognizable to one of ordinary skill in the art that the algorithm could be run in the MSC or utilizing a microprocessor and memory (not shown) built within the position locator 16 shown in FIG. 3 for example.

Accordingly, the invention being thus described, it will be apparent that the same may be varied in many other ways. Such variations are not to be regarded as a departure from the spirit and scope of the invention, and all such modifications that would be obvious to one skilled in the art are intended to be included within the scope of the following claims.

What is claimed is:

1. A method of calculating a position of wireless mobile unit, comprising the steps of:
   determining a location of at least one base station receiving a signal from the wireless mobile unit;
   estimating a first distance between the wireless mobile unit and the at least one base station;
   determining a location of a portable unit; and
   calculating an originating location of the wireless mobile unit based upon the determined location of the at least one base station and movement of the portable unit toward a point, the point based on the first distance.

2. The method of claim 1, wherein the location of the portable unit is determined by means of a position detector included within the portable unit.

3. The method of claim 2, wherein the location of the portable unit is determined by a global positioning system (GPS) receiver.

4. The method of claim 3, wherein the portable unit includes a transceiver and wherein the step of determining a location of at least one base station includes receiving a signal from the at least one base station.

5. The method of claim 1, wherein the portable unit includes a transceiver and wherein the step of determining a location of at least one base station includes receiving a signal from the at least one base station.

6. The method of claim 1, further comprising the steps of:
   estimating a second distance between the portable unit and the wireless mobile unit, wherein the second distance is used in the calculating of the originating location of the wireless unit.

7. The method of claim 6, wherein the first distance is estimated based on a time of arrival (TOA) of a signal sent from the at least one base station and the second distance is estimated based on a time of arrival (TOA) of a signal sent from the wireless mobile unit.

8. The method of claim 6, wherein the first distance is estimated based on a time distance of arrival (TDOA) of a signal sent from the at least one base station and the second distance is estimated based on a time distance of arrival (TDOA) of a signal sent from the wireless mobile unit.

9. The method of claim 6, further comprising the steps of:
   calculating two intersecting points of two circles, respectively originating at the determined locations of the at least one base station and the portable unit and respectively radiating out by the estimated first and second distance;
   re-estimating the second distance upon the portable unit moving towards a randomly selected one of the two calculated intersecting points; and
   selecting the randomly selected one of the two calculated intersecting points as the originating location of the wireless mobile unit upon the re-estimated second distance being relatively shorter than the estimated second distance.

10. The method of claim 8, further comprising the step of:
    selecting the other one of the two calculated intersecting points, not randomly selected, as the originating location of the wireless mobile unit upon the re-estimated second distance being relatively longer than the estimated second distance.

11. The method of claim 6, further comprising the steps of:
- calculating two intersecting points of two circles, respectively originating at the determined locations of the at least one base station and the portable unit and respectively radiating out by the estimated first and second distance;
- re-estimating the second distance upon the portable unit moving and redetermining the location of the portable unit;
- recalculating two intersecting points of two circles, respectively originating at the determined location of the at least one base station and the redetermined location of the portable unit and respectively radiating out by the estimated first distance and the re-estimated second distance; and
- determining the one of the two calculated intersecting points that matches one of the recalculated two intersecting points as the originating location of the wireless mobile unit.

12. The method of claim 1, further comprising the steps of:
- calculating a first hyperbola based upon the determined locations of the at least one base station and the portable unit;
- re-determining the second location of the portable unit upon the portable unit moving;
- calculating a second hyperbola based upon the determined location of the at least one base station and the re-determined location of the portable unit; and
- calculating an intersecting point of the first and second hyperbolas as the originating location of the wireless mobile unit.

13. A position locating apparatus, comprising:
- a transceiver for transmitting and receiving signals to and from a wireless mobile unit; and
- a position detector for determining a geographic position of the position locating apparatus, wherein the determined geographic position of the position locating apparatus, an estimated distance between the position locating apparatus and the wireless mobile unit, and movement of the position detector toward a location based on the estimated distance, the estimated distance based upon signals transmitted to and received from the wireless mobile unit, are used to determine a geographic location of the wireless mobile unit.

14. The position locating apparatus of claim 13, wherein the position detector is a global positioning system (GPS) receiver.

15. The position locating apparatus of claim 13, wherein the transceiver is further for transmitting signals to and receiving signals from a base station and wherein the position of the wireless mobile unit is continuously redetermined as the position locating apparatus moves toward the wireless mobile unit.

16. The position locating apparatus of claim 15, wherein the determined geographic position of the position locating apparatus and the estimated distance between the position locating apparatus and the wireless mobile unit are used in combination with a determined location of at least one base station receiving a signal from the wireless mobile unit and an estimated distance between the wireless mobile unit and the at least one base station, to determine the geographic location of the wireless unit.

17. The position locating apparatus of claim 16, wherein the transceiver is further for transmitting signals to and receiving signals from a base station and wherein the position of the wireless mobile unit is continuously redetermined as the position locating apparatus moves toward the wireless mobile unit.

18. The position locating apparatus of claim 13, wherein the position locating apparatus is for use in a rescue vehicle and is used in determining a geographic location of a wireless mobile unit emanating a distress call.

19. A position locator system, comprising:
- first means for determining a first location of at least one base station receiving a signal from a wireless mobile unit and for estimating a first distance between the wireless mobile unit and the at least one base station;
- second means for receiving a second location of an emergency vehicle and for estimating a second distance between the emergency vehicle and the wireless mobile unit; and
- third means for calculating an originating location of the wireless mobile unit based on the first and second locations and movement of the emergency vehicle toward a location based on the first and second estimated distances.

20. The position locator system of claim 19, wherein,
- the third means calculates two potential originating locations of the wireless mobile unit and transmits the two calculated potential originating locations to the emergency vehicle, and as the emergency vehicle travels toward one of the two calculated potential originating locations, the second means re-estimates the second distance, and wherein,
- upon the re-estimated second distance being relatively shorter than the estimated second distance, the third means transmits a signal indicating that the emergency vehicle is traveling toward a correct one of the two possible originating locations of the wireless mobile unit.

21. The position locator system of claim 20, wherein, upon the re-estimated second distance being relatively longer than the estimated second distance, the third means transmits a signal indicating that the emergency vehicle is traveling toward an incorrect one of the two possible originating locations of the wireless mobile unit.

* * * * *